(12) United States Patent
Mangal et al.

(10) Patent No.: US 11,281,957 B2
(45) Date of Patent: Mar. 22, 2022

(54) SYSTEMS, METHODS, AND MEDIA FOR MULTI-ANTENNA, DIRECTIONAL BACKSCATTER TAGS

(71) Applicant: The Trustees of Columbia University in the City of New York, New York, NY (US)

(72) Inventors: Vivek Mangal, New York, NY (US); Peter R. Kinget, Summit, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 17/205,205

(22) Filed: Mar. 18, 2021

(65) Prior Publication Data

US 2021/0209434 A1 Jul. 8, 2021

Related U.S. Application Data

(63) Continuation of application No. PCT/US2019/052029, filed on Sep. 19, 2019.

(Continued)

(51) Int. Cl.
*G06K 19/07* (2006.01)
*G06K 7/10* (2006.01)
(Continued)

(52) U.S. Cl.
CPC ..... *G06K 19/0723* (2013.01); *G06K 7/10356* (2013.01); *H01Q 1/2208* (2013.01); *H04B 5/0062* (2013.01); *H04B 7/22* (2013.01)

(58) Field of Classification Search
CPC ............................................. G06K 19/0723

(Continued)

(56) References Cited

U.S. PATENT DOCUMENTS 6,903,656 B1  6/2005 Lee
8,390,431 B1  3/2013 Diorio
(Continued)

FOREIGN PATENT DOCUMENTS

CN      106294247      1/2017
EP        2287779      2/2011
WO   WO 2017132400    8/2017

OTHER PUBLICATIONS

Bharadia, D., et al., "BackFi: High Throughput WiFi Backscatter", In Proceedings of the SIGCOMM, London, UK, Aug. 17-21, 2015, pp. 283-296.

(Continued)

*Primary Examiner* — Rafferty D Kelly
(74) *Attorney, Agent, or Firm* — Byrne Poh LLP (57) ABSTRACT

Backscatter tags, comprising: antennas; single pole, multiple throw switches each switch (S) having pole terminal connected to one of the antennas, and each having first throw terminal (TT) connected to first side (FS) of inductor (I) for S, second TT connected to FS of capacitor (C) for S, third TT connected to fixed voltage level (FVL), fourth TT that is floating, wherein second side (SS) of I and SS of C are connected to the FVL; power combiner (PC) having inputs connected to fifth TT of each of two of the switches; power detector (PD) having an input connected to output of PC; analog to digital converter (ADC) having input connected to output of PD; hardware processor coupled to output of the ADC and coupled to control terminal of each of the switches.

10 Claims, 12 Drawing Sheets

Related U.S. Application Data (60) Provisional application No. 62/733,479, filed on Sep. 19, 2018.

(51) Int. Cl.
*H01Q 1/22* (2006.01)
*H04B 5/00* (2006.01)
*H04B 7/22* (2006.01)

(58) Field of Classification Search
USPC .......................................................... 235/492
See application file for complete search history.

(56) References Cited

U.S. PATENT DOCUMENTS

| | | | |
|---|---|---|---|
| 9,680,533 | B2 | 6/2017 | Gudan et al. |
| 2006/0125602 | A1 | 6/2006 | Posamentier et al. |
| 2008/0024279 | A1 | 1/2008 | Gravelle et al. |
| 2008/0150693 | A1 | 6/2008 | You et al. |
| 2008/0258876 | A1 | 10/2008 | Overhultz et al. |
| 2010/0060424 | A1 | 3/2010 | Wild et al. |
| 2015/0108210 | A1* | 4/2015 | Zhou ................... H04W 4/02 235/375 |

OTHER PUBLICATIONS

Casati, G., et al., "The Interrogation Footprint of RFID-UAV: Electromagnetic Modeling and Experimentations", In IEEE Journal of Radio Frequency Identification, vol. 1, Jun. 2017, pp. 155-162.

Chen, L., et al., "Overview on the Phase Conjugation Techniques of the Retrodirective Array", In International Journal of Antennas and Propagation, May 2010, pp. 1-10.

Griffin, J.D. and Durgin, G.D., "Gains For RF Tags Using Multiple Antennas", In IEEE Transactions of Antennas and Propagation, vol. 56, No. 2, Feb. 2008, pp. 563-570.

Griffin, J.D. and Durgin, G.D., "Multipath Fading Measurements at 5.8 GHz for Backscatter Tags With Multiple Antennas", In IEEE Transactions on Antennas and Propagation, vol. 58, No. 11, Nov. 2010, pp. 3693-3700.

International Search Report and Written Opinion dated Dec. 4, 2019 in International Patent Application No. PCT/US2019/052029, pp. 1-11.

Kellogg, B., et al., "Passive Wi-Fi: Bringing Low Power to Wi-Fi Transmissions", In Proceedings of the USENIX Symposium on Networked Systems Design and Implementation, Santa Clara, CA, US, Mar. 16-18, 2016, pp. 151-164.

Kellogg, B., et al., "Wi-Fi Backscatter: Internet Connectivity for RF-Powered Devices", In Proceedings of the ACM Conference on SIGCOMM, Chicago, IL, US, Aug. 17-22, 2014, pp. 607-618.

Makarov, S., "On Body Passive RFID Antenna Array and Testbed to Assess Changes in Bone Structure", NIH Grant #1R43AR071220-01A1, pp. 1-3.

Mangai, V. and Kinget, P.R., "An Ultra-Low-Power Wake-Up Receiver with Voltage-Multiplying Self-Mixer and Interferer-Enhanced Sensitivity", In Proc. of the IEEE Custom Integrated Circuits Conf., Austin, TC, US, Apr. 30-May 3, 2017, pp. 1-4.

Moura, J.M.F. and Jin, Y., "Detection by Time Reversal: Single Antenna", In IEEE Transactions on Signal Processing, vol. 55, No. 1, Jan. 2007, pp. 187-201.

Parks, A.N., et al., "Turbocharging Ambient Backscatter Communication", In Proceedings of the ACM Conference on SIGCOMM, Chicago, IL, US, Aug. 17-22, 2014, pp. 619-630.

Sharma, S., "Novel Reconfigurable Aperture Antennas and Arrays for Compact Multifunctional Antenna Solutions", NSF Grant #0845822, pp. 1-3.

Talia, V., et al., "LoRa Backscatter: Enabling the Vision of Ubiquitous Connectivity", In Proceedings of the ACM on Interactive, Mobile, Wearable and Ubiquitous Technologies, New York, NY, US, Sep. 2017, pp. 1-24.

Trotter, M.S., et al., "Multi-Antenna Techniques for Enabling Passive RFID Tags and Sensors at Microwave Frequencies", In Proceedings of the IEEE International Conference on RFID, Orlando, FL, US, Apr. 3-5, 2012, pp. 1-7.

Varshney, A., et al., "LoRea: A Backscatter Architecture that Achieves a Long Communication Range", In Proc. of the ACM Conf. on Embedded Network Sens. Sys., Delft, NE, Nov. 5-8, 2017, pp. 1-15.

Yang, G., et al., "Multi-Antenna Wireless Energy Transfer for Backscatter Communication Systems", In IEEE Journal on Selected Areas in Communications, vol. 33, No. 12, Dec. 2015, pp. 2974-2987.

Zhang, P., et al., "EkhoNet: High Speed Ultra Low-Power Backscatter for Next Generation Sensors", In Proc. of the Intl. Conf. on Mobile Computing and Networking, Maui, HI, US, Sep. 7-11, 2014, pp. 557-568.

\* cited by examiner

SYSTEMS, METHODS, AND MEDIA FOR MULTI-ANTENNA, DIRECTIONAL BACKSCATTER TAGS

CROSS REFERENCE TO RELATED APPLICATION

This application is a continuation of International Patent Application No. PCT/US2019/052029, filed Sep. 19, 2019, which claims the benefit of U.S. Provisional Patent Application No. 62/733,479, filed Sep. 19, 2018, each of which is hereby incorporated by reference herein in its entirety.

STATEMENT REGARDING GOVERNMENT FUNDED RESEARCH

This invention was made with government support under grant 1309721 awarded by the National Science Foundation. The government has certain rights in the invention.

BACKGROUND

Backscatter tags (e.g., RFID tags) are widely used for a variety of applications, such as security applications, tracking merchandise and people, and storing information. The range of the tags is limited because the tags frequently do not have their own power source (and only get power from a received RF signal) or only have a limited power source.

It is desirable to increase the range of backscatter tags.

SUMMARY

Systems, methods, and media for multi-antenna, directional backscatter tags are provided. In some embodiments, systems for multi-antenna, directional backscatter tags are provided, the systems comprising: a plurality of antennas; a plurality of single pole, multiple throw switches each having a pole terminal connected to a corresponding one of the plurality of antennas, and each having a first throw terminal connected to a first side of an inductor for that switch, a second throw terminal connected to a first side of a capacitor for that switch, a third throw terminal connected to a fixed voltage level, a fourth throw terminal that is floating, and a fifth throw terminal, wherein a second side of the inductor and a second side of the capacitor are connected to the fixed voltage level; a power combiner having inputs connected to the fifth throw terminal of each of two of the plurality of single pole, multiple throw switches and having an output; a power detector having an input connected to the output of the power combiner and having an output; an analog to digital converter having an input connected to the output of the power detector and having an output; a hardware processor coupled to the output of the analog to digital converter and coupled to a control terminal of each of the plurality of single pole, multiple throw switches.

DETAILED DESCRIPTION

Figure 1:
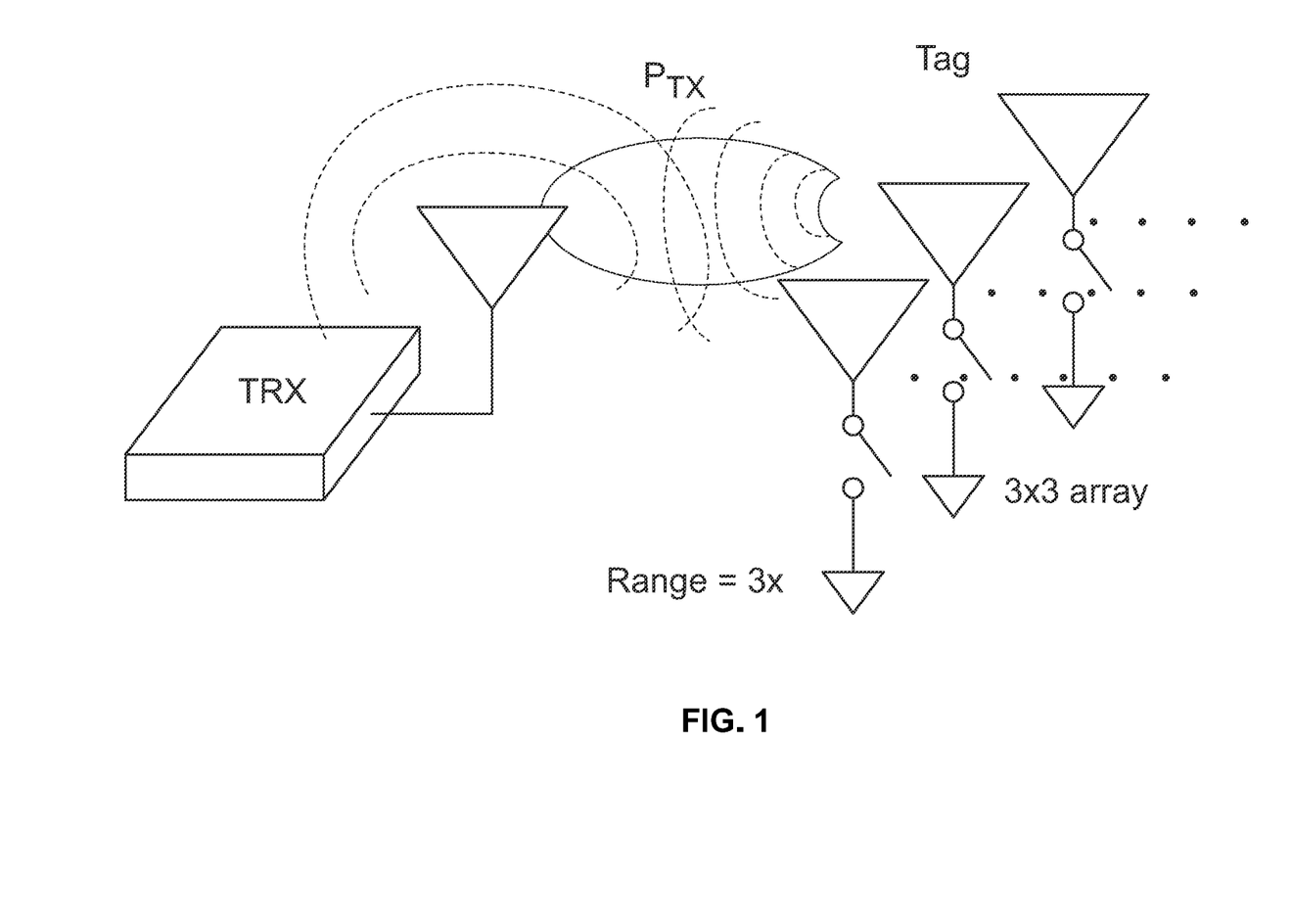
FIG. 1 is an example of a block diagram of a tagger reader and a multi-antenna tag in accordance with some embodiments.

In accordance with some embodiments, multi-antenna backscatter tags that backscatter directional beams to tag readers are provided. In some embodiments, using a 3×3 antenna array in a backscatter tag (as shown in FIG. 1) can provide up to a 19 dB sensitivity enhancement and up to a 3× increase in range between the tag and its reader compared to the same characteristics for single antenna tags.

In some embodiments, a compact phase conjugation technique for backscatter modulation can be used with a backscatter tag having a two-dimensional antenna array in order to achieve improved directivity of the backscatter signal in the direction of arrival of the signal being backscattered.

In some embodiments, for each antenna of multi-antenna backscatter tag, an incoming RF signal can be reflected back by the backscatter antenna with different phase lags depending on its load. For example, in some embodiments, the load can be formed using open, short, inductive, and/or capacitive loads. In some embodiments, each antenna of a multi-antenna backscatter tag can switch between different arrangements of these loads to create a directional backscattered signal. These loads can also be used to implement quadrature phase shift keying (QPSK) modulation of the RF signal in some embodiments. QPSK modulation can be useful to convey a serial number of the tag, data stored in the tag, etc.

To understand the principle of operation, assume that a linear array of three antennas with an antenna spacing of d is being used. For an incident signal at an angle $\theta_i$, when operating in the far field, incident waves with wavelength $\lambda$ received by two adjacent antennas have a phase difference of $\Delta\Phi=2\pi \cdot d \cdot \sin(\theta_i)/\lambda$. To reflect the signal back in the direction of arrival, the reflected signal must have a phase difference of $-\Delta\Phi$. Thus, the loads of adjacent antennas need to provide an extra phase difference of $\Phi_A=-2\Delta\Phi$. If the phase lag of the middle antenna is $\Phi_r=0$ degrees, the other two antennas require a phase lag of $\Phi_A$ and $-\Phi_A$.

Figure 2:
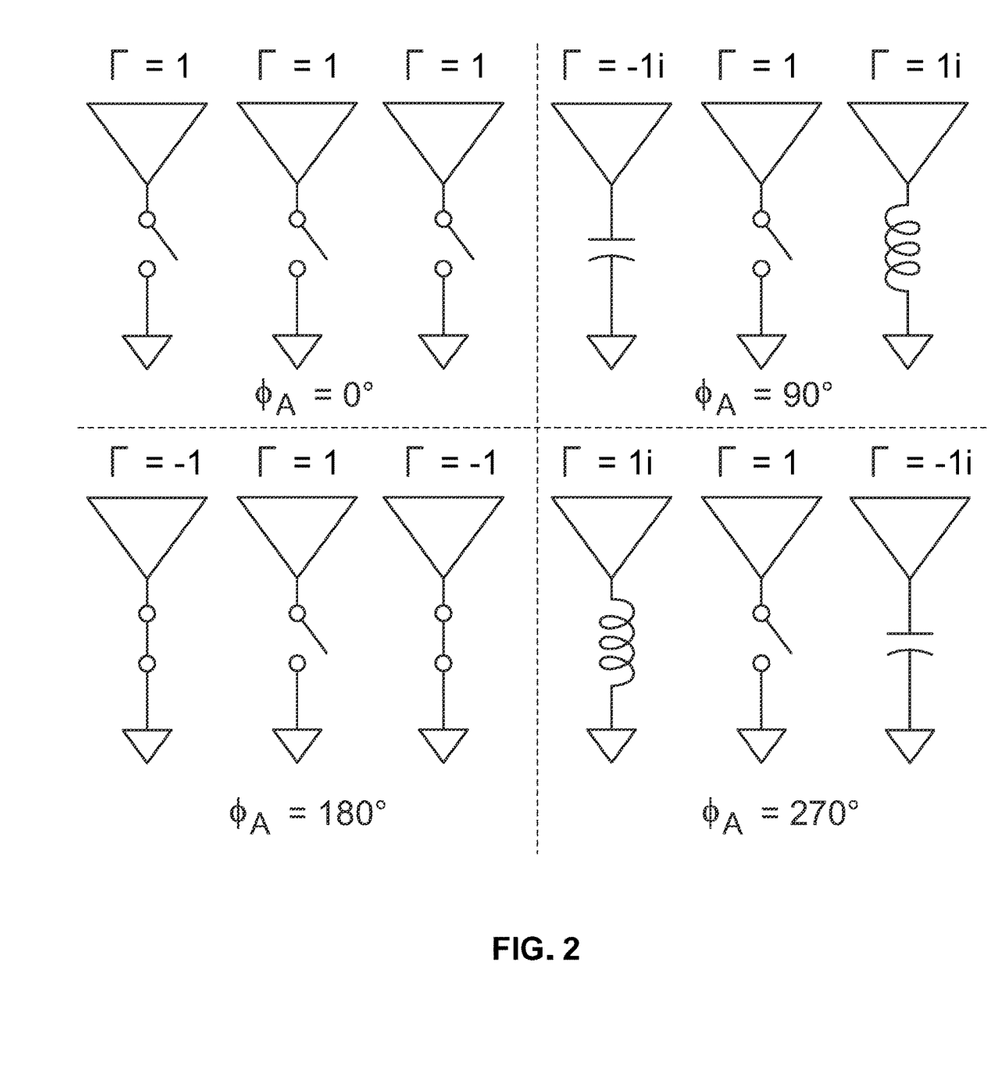
FIG. 2 is an example of four illustrations of different configurations of three antenna used to control a phase gradient in accordance with some embodiments.
Figure 3:
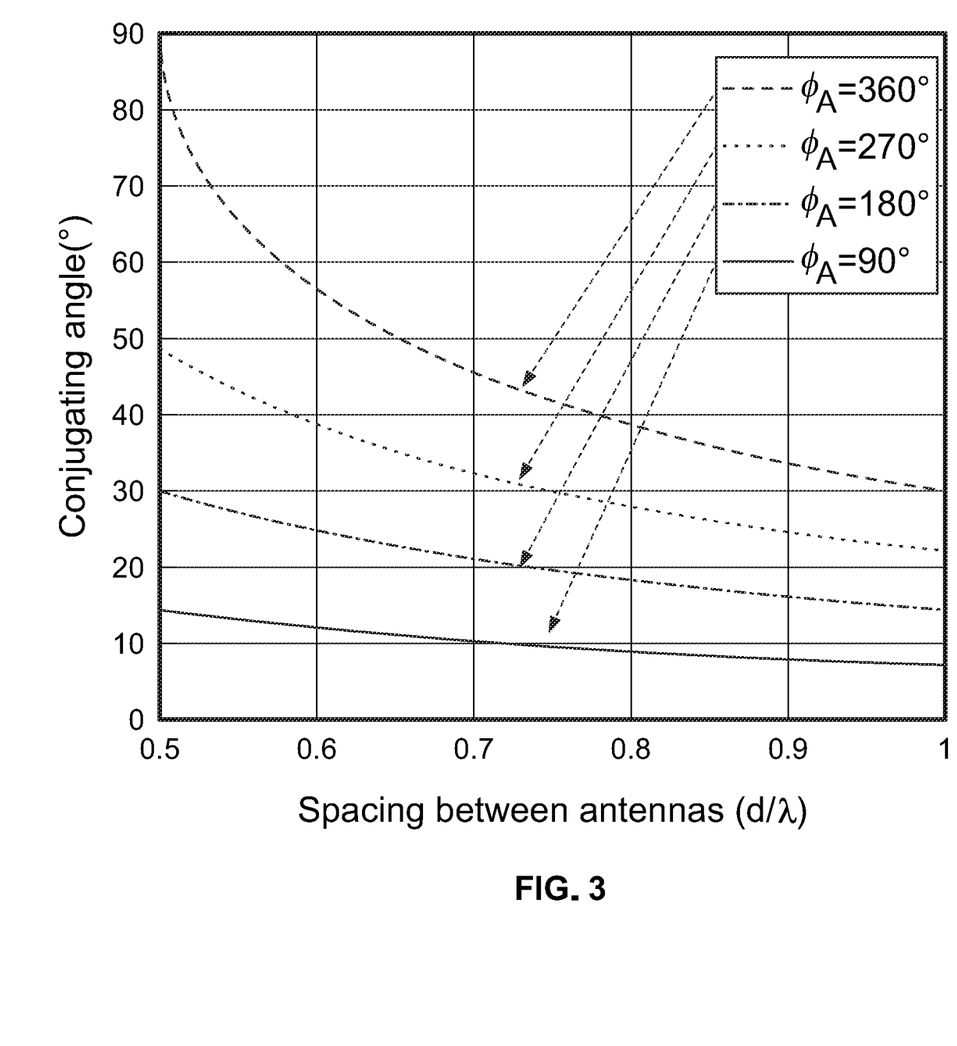
FIG. 3 is an example of a graph showing conjugating angle vs. spacing between antennas for four different phase gradients in accordance with some embodiments.

Using different arrangements of open, short, inductive, and capacitive loads, the phase gradient $\Phi_A$ can be 0 degrees, 90 degrees, 180 degrees, and 270 degrees as shown in FIG. 2. For these values of $\Phi_A$, the corresponding angle of incidence (conjugating angle) at which the backscatter tag achieves maximum directivity of the reflected signal in the direction of arrival is plotted in FIG. 3 for increasing spacing between the antennas. By using an antenna spacing of $0.53\lambda$, evenly spaced conjugating angles of 15 degrees, 30 degrees, 45 degrees, and 60 degrees can be obtained in some embodiments.

Figure 4:
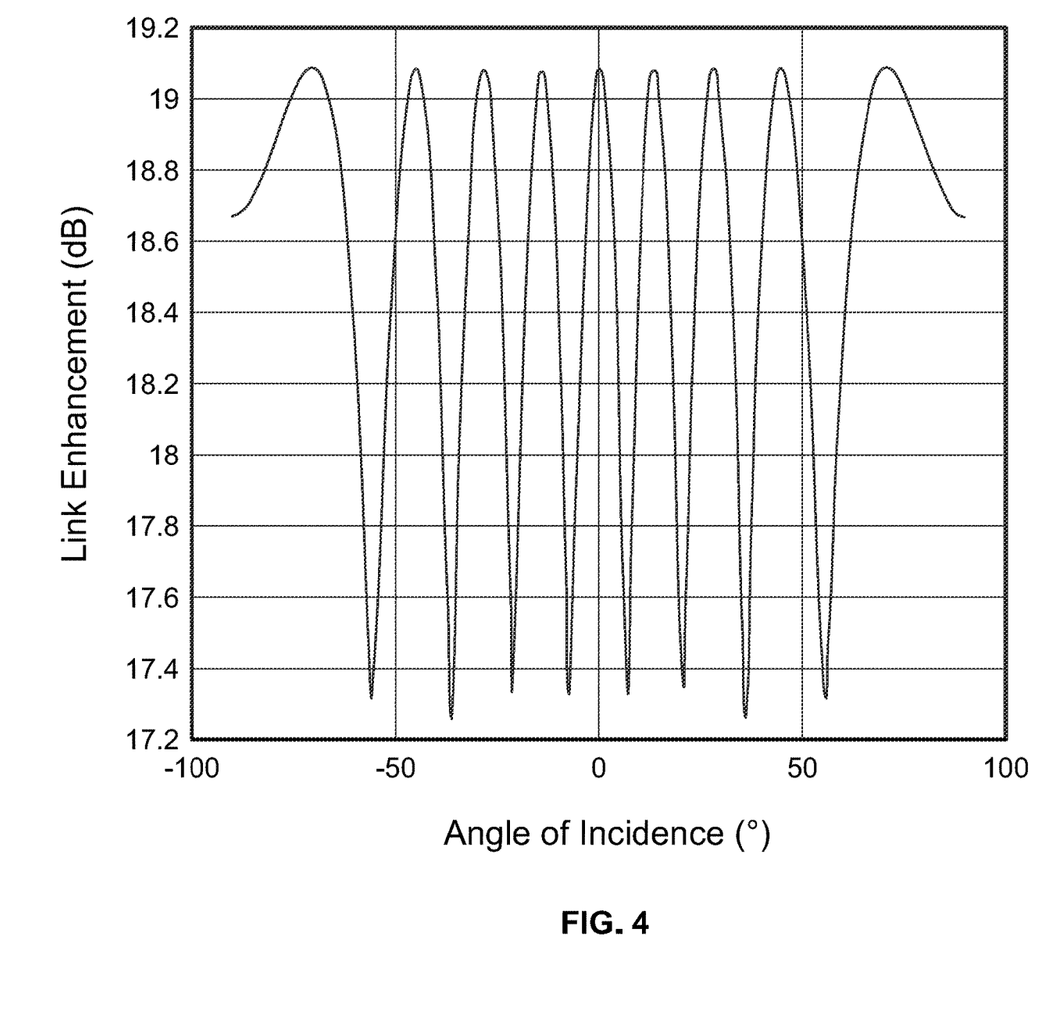
FIG. 4 is an example of a graph showing link enhancement vs. angle of incidence in accordance with some embodiments.
Figure 5:
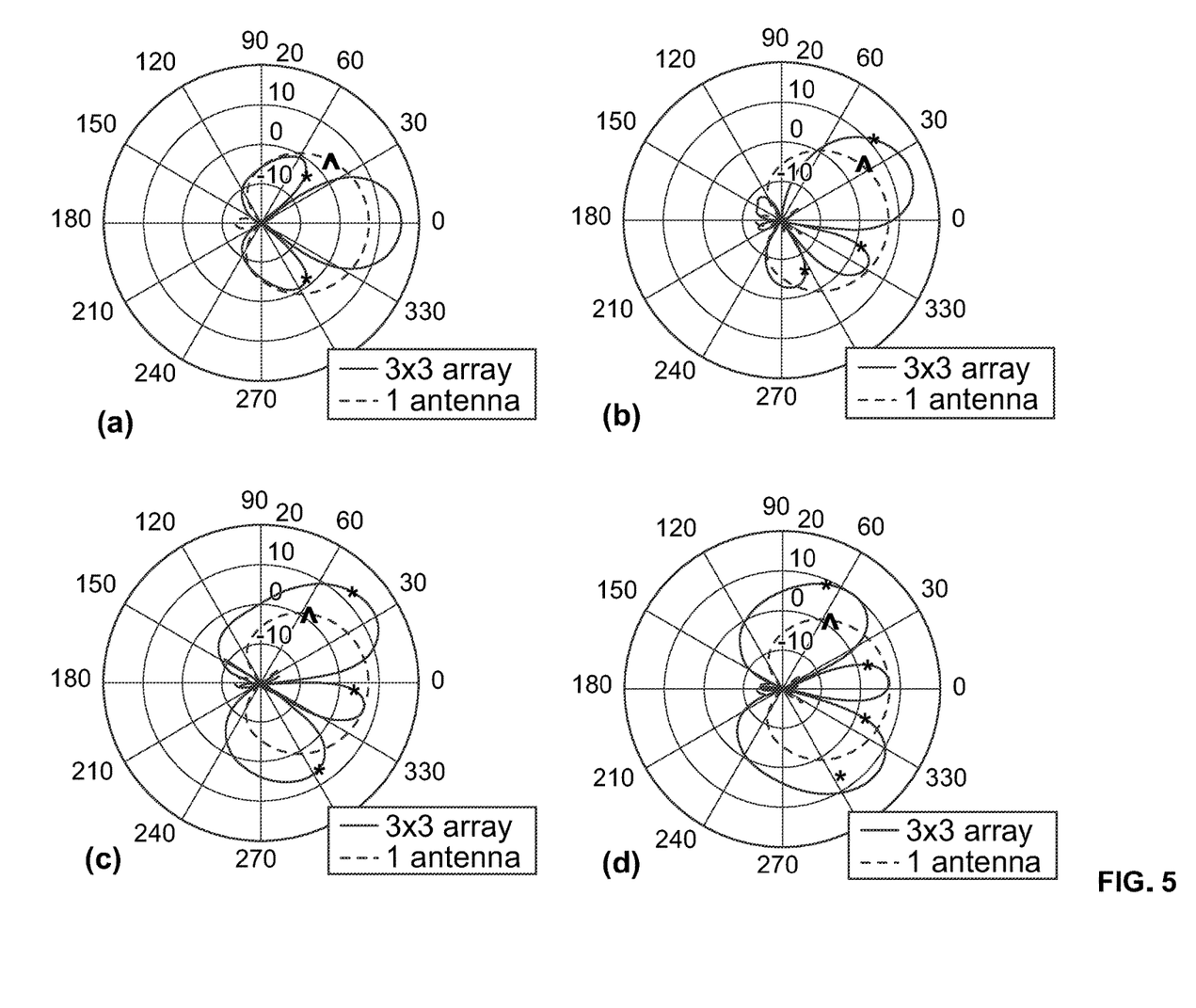
FIG. 5 is an example of four plots showing directionality improvements that can be realized using multiple antennas in a backscatter tag in accordance with some embodiments.

For an N×N array, assuming the required horizontal and vertical phase gradients are $\Phi_A$ and $\Phi_B$, the required phases for the $(i, j)^{th}$ antenna in the array are:

$$\Phi_{ref}(i,j)=(i-(n+1)/2)\Phi_A+(j-(n+1)/2)\Phi_B,$$

where i and j are indices to the antennas in the antenna array of the tag and n is equal to N (i.e., the number of antennas in each dimension of the two-dimensional array. The tag needs to determine the gradients $\Phi_A$ and $\Phi_B$ using a direction of arrival estimation). An N×N array can provide $N^2$ times the link enhancement (e.g., up to 19 dB for a 3×3 array as shown in FIG. 4), thus N times the range. As shown in FIG. 5, for $\Phi_B=0$, the backscatter tag directivity is plotted at $\theta_i=0$ degrees (portion (a) of FIG. 5), 30 degrees (portion (b) of FIG. 5), 45 degrees (portion (c) of FIG. 5), 60 degrees (portion (d) of FIG. 5) using the corresponding $\Phi_A$ for a 3×3 array. The directivity improves by 9 dB for the conjugating angles. For $\Phi_B=0$, the maximum achievable array factor is plotted with respect to the angle of incidence $\theta_i$ in FIG. 4. Limiting the loads to an open load, a shorted load, an inductive load, and a capacitive load leads to a quantization error in $\Phi_A$ and a degradation of up to 2 dB in the array gain.

By changing the reference phase $\Phi_r$, while maintaining the phase gradients $\Phi_A$ and $\Phi_B$, QPSK modulation can be implemented with directional backscattering. For a baseband signal mapped to a QPSK phase $\Phi_m(t)$, the required phase for the $(i, j)^{th}$ antenna is:

$$\Phi(i,j,t)=\Phi_{ref}(i,j)+\Phi_m(t).$$

Figure 6A:
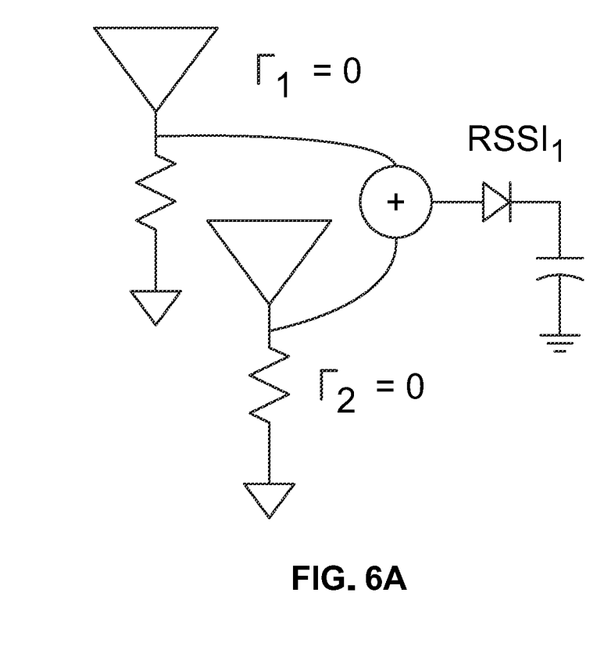
FIGS. 6A, 6B, and 6C show examples of configurations for measuring received power in accordance with some embodiments.
Figure 6B:
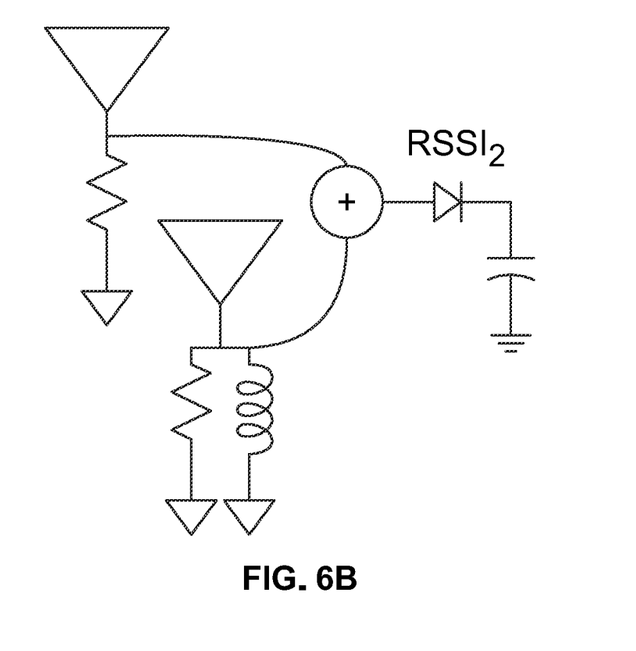
Figure 6C:
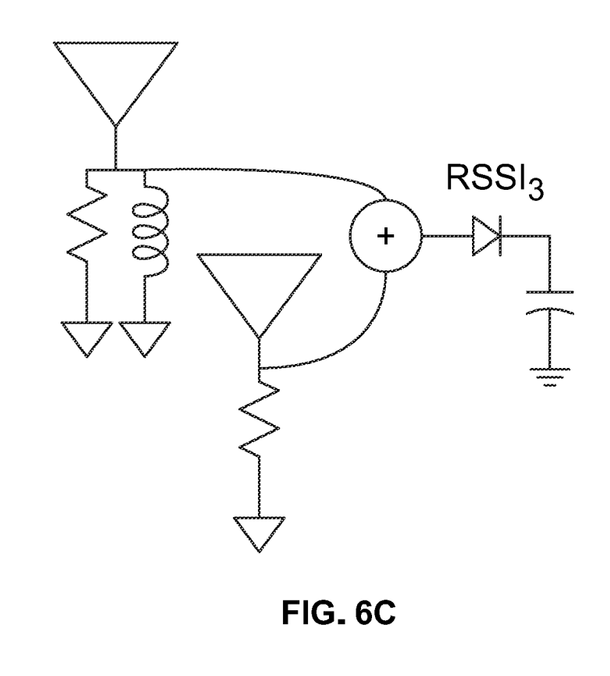
Figure 7:
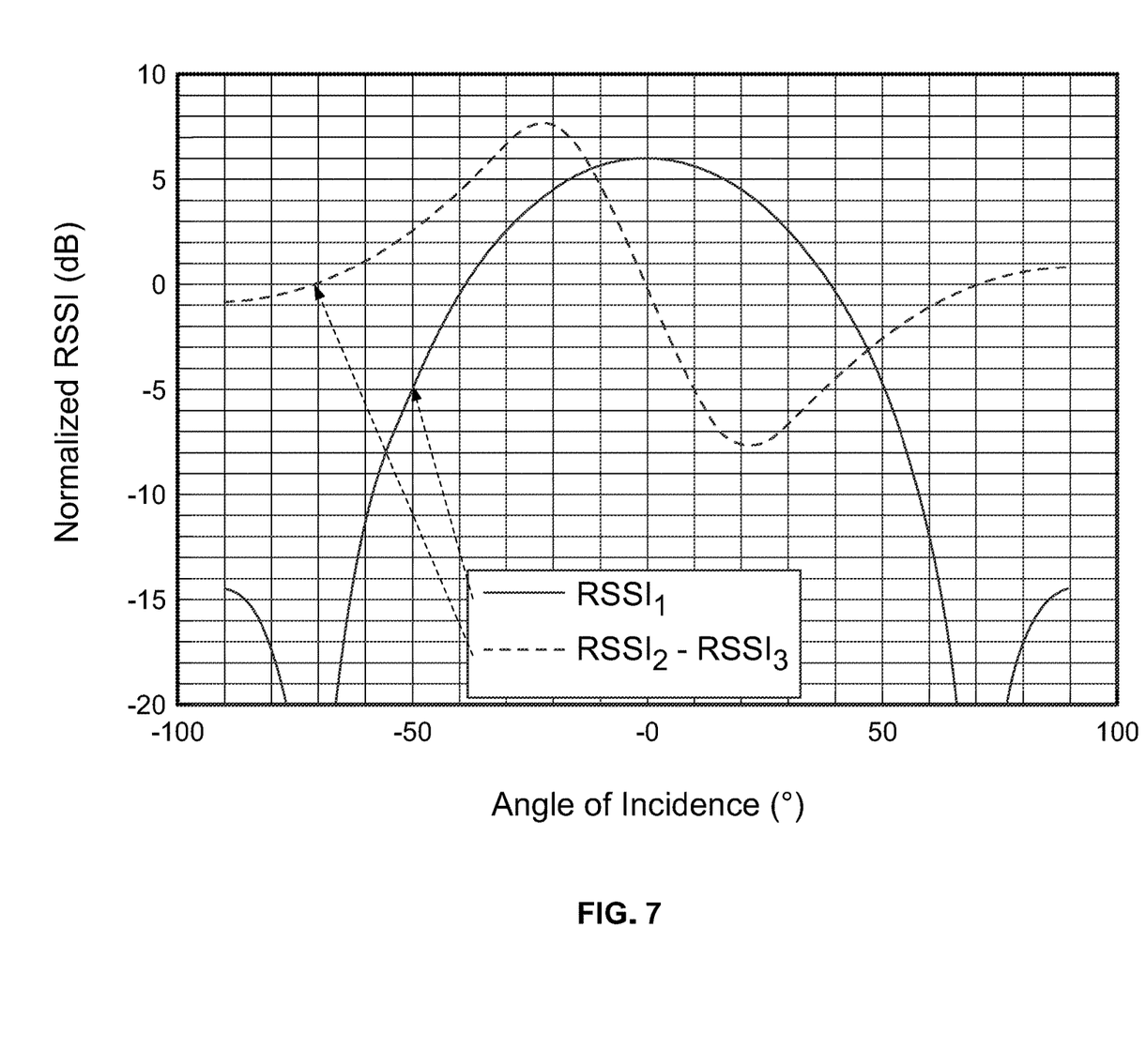
FIG. 7 is an example of graph showing normalized received signal strength indicator (RSSI) vs. angle of incidence in accordance with some embodiments.

For an incoming wave at an angle of incidence $\theta_i$, any two adjacent antennas in a 3×1 linear array receive signals $V_1(t)=A\cdot\sin(\omega\cdot t)$ and $V_2(t)=A\cdot\sin(\omega\cdot t+\Phi)$, where $\Phi=2\pi\cdot d\cdot\sin(\theta_i)/\lambda$, A is the maximum amplitude of the signals, $\omega$ is the angular frequency of the signal, and t is time. $V_1(t)+V_2(t)=2\cdot A\cdot\sin(\omega\cdot t)\cos(\Phi/2)$. Adding the signals in-phase (FIGS. 6A-6C) and detecting the power received gives $P=2\cdot A^2\cdot\cos^2(\Phi/2)$, $\theta_i$ can then be calculated by $\theta_i=\sin^{-1}(\lambda\cdot\cos^{-1}(\sqrt{P/(2A^2)})/(2\pi d))$. An example of the sum of the two signals normalized with the received power on one antenna is plotted as a first received signal strength indicator ($RSSI_1$) in FIG. 7. However, $RSSI_1$ is symmetric with respect to $\theta_i=0$. The sign of $\theta_i$ can be evaluated using the derivative of $RSSI_1$, measured by connecting an inductor as shown in FIGS. 6B and 6C and calculating the difference in the received signal strengths ($RSSI_2$ and $RSSI_3$). An example of $RSSI_2-RSSI_3$ is plotted in FIG. 7. Direction of arrival can be successfully estimated over a range of $\theta_i$ from −60 degrees to +60 degrees. For $|\theta_i|>60$ degrees, $RSSI_1$ is less than −13 dB and the required phase gradient, $\Phi_A=0$ degrees.

Figure 8:
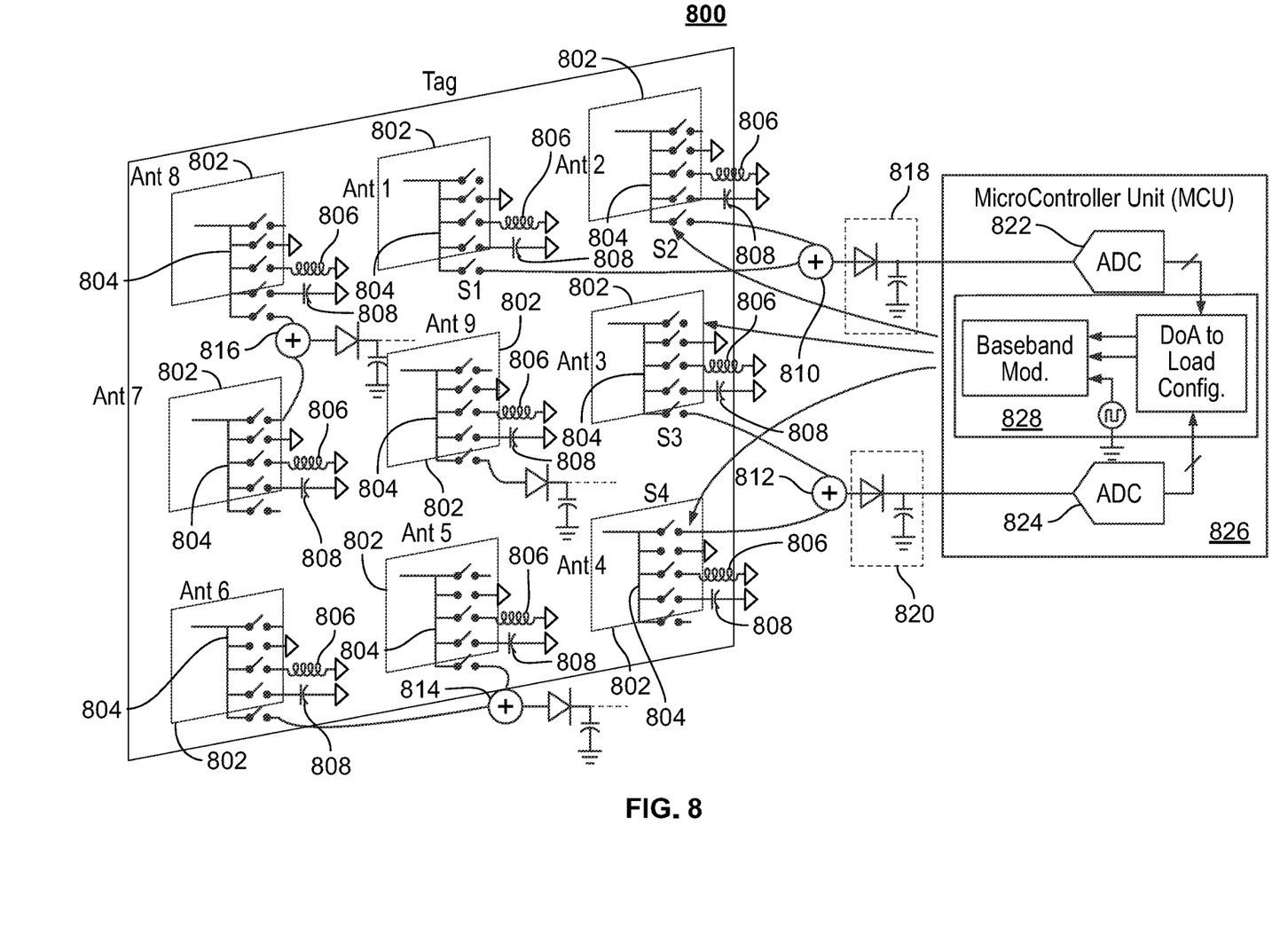
FIG. 8 is an example of a block diagram of a tag in accordance with some embodiments.

Turning to FIG. 8, a schematic 800 of an example of a tag architecture in accordance with some embodiments is provided. As shown, the tag can include an array of antennas 802 (e.g., such as a 3×3 array as illustrated). Any suitable number and any suitable type of antennas can be used in the array in some embodiments. For example, a 3×3 antenna array using patch antennas sized 3 cm by 3.8 cm with a 6.5 cm center-to-center spacing on a 31 mil-thick ISOLA 370HR substrate can be used for a 2.45 GHz signal in some embodiments.

Each antenna can be connected to a pole terminal of a single pole, multiple throw switch 804. This switch can be used to switch the antenna load for load modulation and determine the direction of arrival. Any suitable switch can be used as switch 804 in some embodiments, and the switch can have any suitable number of throw terminals. For example, in some embodiments, an SP5T switch (SKY13415) available from SKYWORKS SOLUTIONS, INC. of Woburn, Mass. can be used as switch 804. Moreover, in some embodiments, a combination of switches can be used to realize switch 804.

As shown in the figure, the throw terminals of the switches can be connected to inductors 806, capacitors 808, a fixed voltage (e.g., such as a ground voltage), and inputs to power combiners in some embodiments. Any suitable inductor(s), capacitor(s), and fixed voltage(s) can be used in some embodiments. For example, in some embodiments, an inductor 806 can be an SMD 3nH 0201 inductor available from MURATA MANUFACTURING COMPANY, LTD. of Kyoto, Japan. As another example, in some embodiments, a capacitor 808 can be a 1.3 pF 0402 capacitor available from AVX Corporation of Greenville, S.C., USA.

Antennas 1 and 2 (Ant 1 and Ant 2) can provide a first pair of antennas and are connected to a first power combiner 810. Antennas 3 and 4 (Ant 3 and Ant 4) can provide a second pair of antennas and are connected to a second power combiner 812. Antennas 5 and 6 (Ant 5 and Ant 6) can provide a third pair of antennas and are connected to a third power combiner 814. Antennas 7 and 8 (Ant 7 and Ant 8) can provide a fourth pair of antennas and are connected to a fourth power combiner 816. And antenna 9 (Ant 9) can provide a reference antenna.

As shown, the outputs of the four power combiners (810, 812, 814, and 816) and antenna 9 can each be connected to a rectifier (e.g., rectifiers 818 and 820). Any suitable power combiners can be used in some embodiments. For example, in some embodiments, a SP-2U2+ available from Mini-Circuits of Brooklyn, N.Y. can be used.

The five rectifiers can be also connected to the inputs of five analog to digital converters (this connection and the analog to digital converters (ADCs 822 and 824) are only shown for the first pair of antennas and the second pair of antennas for clarity of the figure). The ADCs can be used to digitize the output of the power detectors. Any suitable ADCs can be used in some embodiments.

As shown in FIG. 8, the analog to digital converters can be part of a Micro-Controller Unit (MCU) 826 in some embodiments. The MCU can also include a controller that determines the direction of arrival (DoA) and the required load configuration (for controlling the direction of the backscatter), a baseband modulator (for QPSK modulation), and a local oscillator. Any suitable MCU can be used in some embodiments. For example, in some embodiments, the MCU can be implemented using a Teensy 3.6 MCU available from Paul Stoffregen of Sherwood, Oreg.

Figure 9:
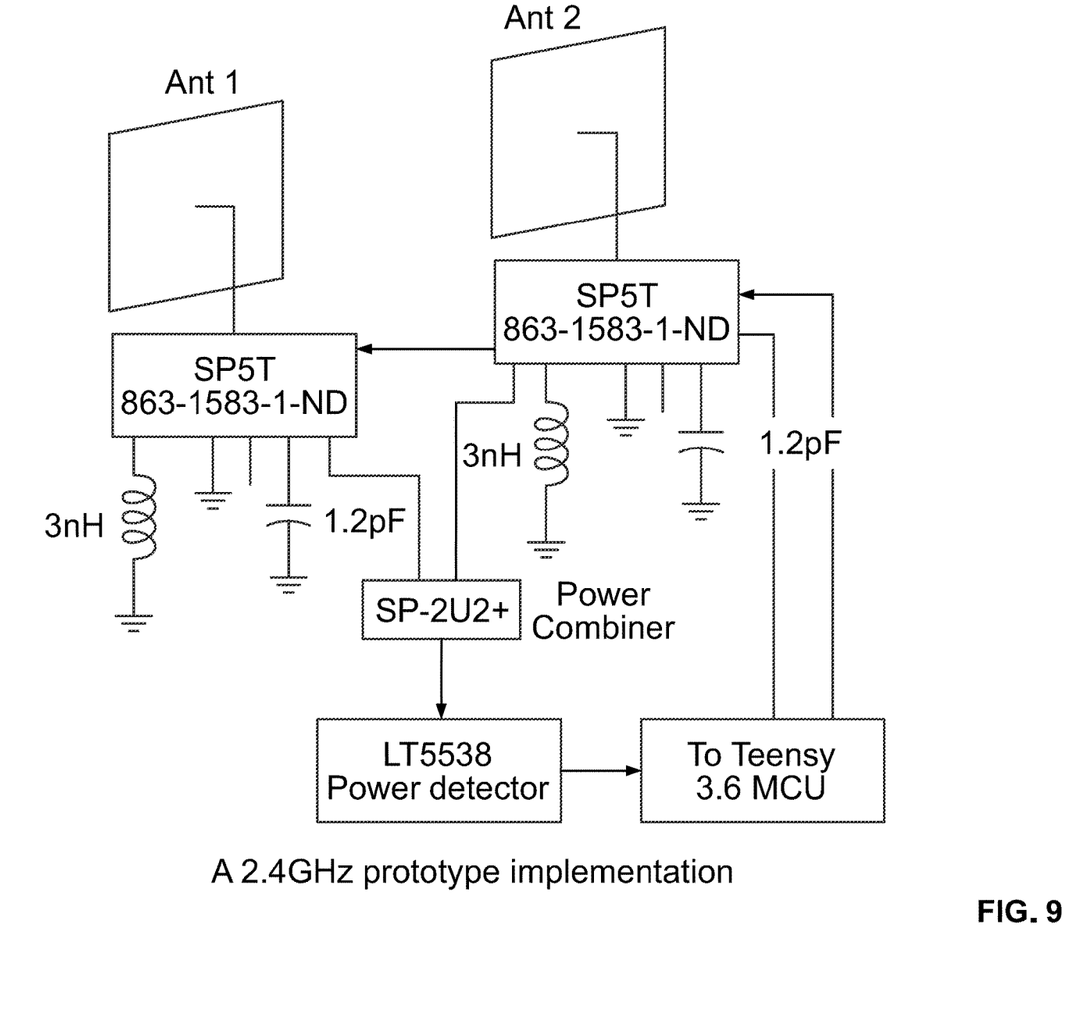
FIG. 9 is an example of a block diagram of another tag in accordance with some embodiments.

FIG. 9 provides a more specific example of a schematic of a portion of a tag in accordance with some embodiments. As illustrated, FIG. 9 only shows two antennas, two switches (and associated inductors and capacitors), a single power combiner, and a single power detector for purposes of clarity. It should be understood that replicas of these components could be provided for each pair of antennas in a tag having any suitably sized array in some embodiments.

As shown in FIG. 9, each antenna can be connected to a single pole, multiple throw switch, which can be implemented using part number 863-1583-1-ND from Skyworks Solutions, Inc. of Woburn, Mass. in some embodiments. One throw terminal of each switch can be connected to one side of a 3nH inductor (which can be for a 2.4 GHz implementation; any other suitable value can be used in some embodiments), whose other side is connected to a fixed voltage level, such as ground. Another throw terminal of each switch can be connected to the fixed voltage level, such as ground. Still another throw terminal of each switch can be floating. Yet another throw terminal of each switch can be connected to one side of a 1.2 pF capacitor (which can be for a 2.4 GHz implementation; any other suitable value can be used in some embodiments), whose other side is connected to the fixed voltage level, such as ground. Still another throw terminal of each switch can be connected to the input of a power combiner. In some embodiments, the power combiner can be implemented using part number SP-2U2+ from Mini-Circuits of Brooklyn, N.Y. The output of the power combiner can be connected to the input of a power detector, which can be implemented using part number LT5538 from Analog Devices of Norwood, Mass. The output of the power detector can be connected to analog to digital converter input of an MCU. In some embodiments, the MCU can be implemented using a Teensy 3.6 MCU available from Paul Stoffregen of Sherwood, Oreg.

Figure 10:
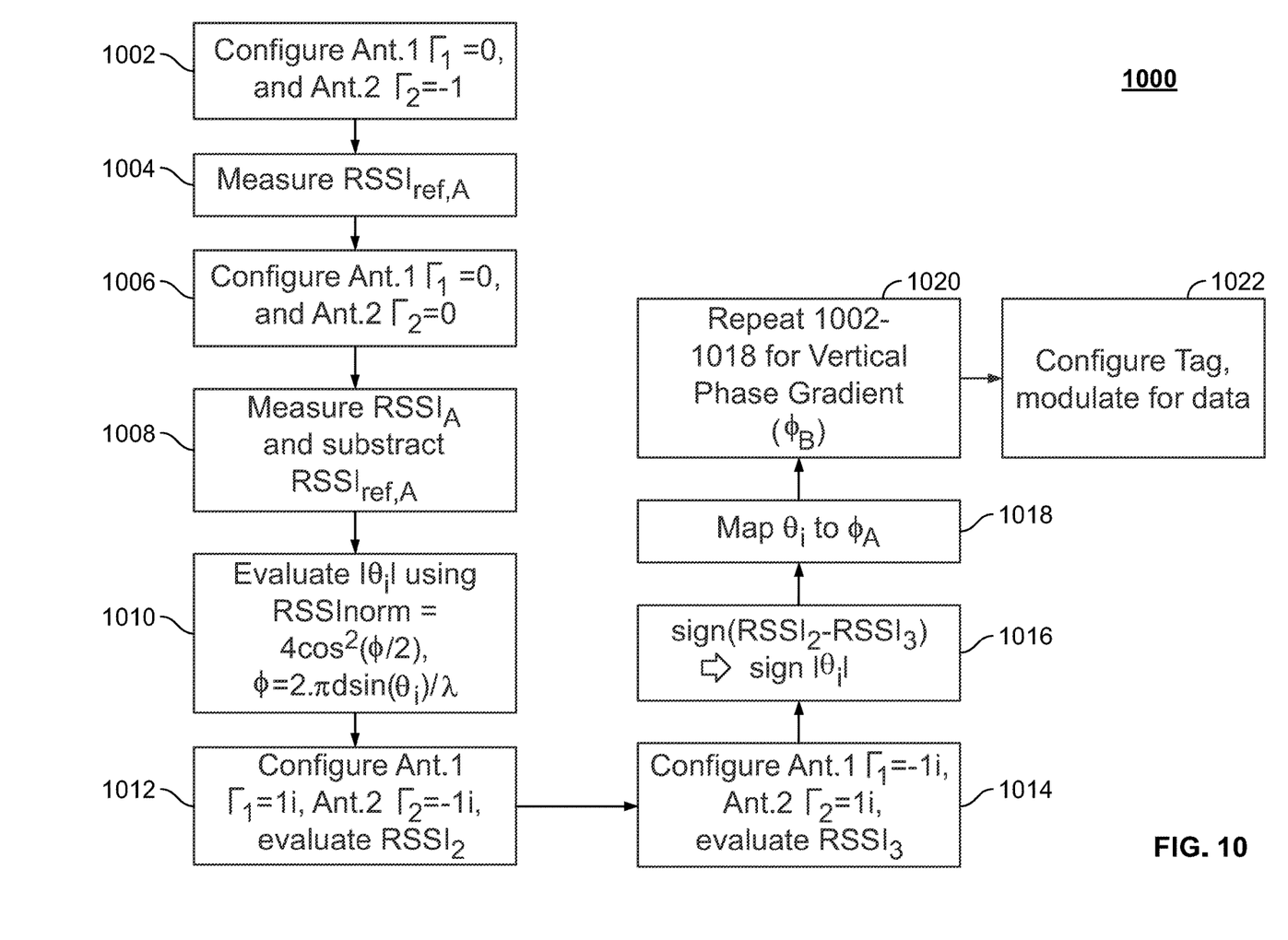
FIG. 10 is an example of process for controlling a tag in accordance with some embodiments.

Turning to FIG. 10, an example 1000 of a process that can be implemented in an MCU in accordance with some embodiments is shown. As illustrated, after process 1000 begins, at 1002 the process can configure the switches for each antenna. For example, for Ant 1 (which is illustrated in FIG. 8 as having five sub-switches) to have $\Gamma_1=0$, $S_1$ can be configured to have the top sub-switch open, the second from the top (grounded) sub-switch closed, the inductor sub-switch and the capacitor sub-switch open, and the bottom sub-switch closed, and for Ant 2 (which is also illustrated in FIG. 8 as having five sub-switches) to have $\Gamma_2=0$, $S_2$ can be configured to have the top four sub-switches open and the bottom sub-switch open.

Next, at 1004, process 1000 can measure the received signal strength indication (RSSI) from Ant 1 as $RSSI_{ref,A}$. Alternatively, in some embodiments, $RSSI_{ref,A}$ can be measured using a dedicated reference antenna, such as the center antenna in FIG. 8, in which case 1002 and 1004 can be modified accordingly.

Then, at 1006, process 1000 can re-configure the switches for each antenna. For example, for Ant 1 to have $\Gamma_1=0$, $S_1$ can be configured to have the top four sub-switches open and the bottom sub-switch closed, and for Ant 2 to have $\Gamma_2=0$, $S_2$ can be configured to have the top four sub-switches open and the bottom sub-switch closed.

At 1008, process 1000 can then measure $RSSI_A$ using an analog to digital converter coupled to the center antenna of FIG. 8 by a rectifier or power detector, and then calculate $RSSI_{norm}$ (in dB) as $RSSI_A$ (in dB) minus $RSSI_{ref,A}$ (in dB).

Next, at 1010, process 1000 can evaluate $|\theta_i|$ using:

$$\theta_i = \sin^{-1}(\lambda \cdot \cos^{-1}(\sqrt{RSSI_{norm}/4})/(2\pi d)).$$

where d is the distance between the antennas, $\lambda$ is the wavelength of the received signal.

Then, at 1012, process 1000 can re-configure the switches for each antenna. For example, for Ant 1 to have $\Gamma_1=1i$, $S_1$ can be configured to have the top two sub-switches open, the inductor sub-switch closed, the capacitor sub-switch open, and the bottom sub-switch closed, and for Ant 2 to have $\Gamma_2=-1i$, $S_2$ can be configured to have the top two sub-switches open, the inductor sub-switch open, the capacitor sub-switch closed, and the bottom sub-switch closed. At 1012, process 1000 can then measure $RSSI_2$.

At 1014, process 1000 can then re-configure the switches for each antenna. For example, for Ant 1 to have $\Gamma_1=-1i$, $S_1$ can be configured to have the top two sub-switches open, the inductor sub-switch open, the capacitor sub-switch closed, and the bottom sub-switch closed, and for Ant 2 to have $\Gamma_2=1i$, $S_2$ can be configured to have the top two sub-switches open, the inductor sub-switch closed, the capacitor sub-switch open, and the bottom sub-switch closed. At 1014, process 1000 can then measure $RSSI_3$.

Next, at 1016, process 1000 can determine the sign of $RSSI_2$ minus $RSSI_3$ and infer from that sign the sign of $|\theta_i|$.

Then, at 1018, process 1000 can map $\theta_i$ to ($\Phi_A$ (the horizontal phase gradient).

At 1020, process 1000 can repeat steps 1002-1018 as described above using Ant 3, Ant 4, S3, and S4 instead of Ant 1, Ant 2, S1, and S2, respectively, for the vertical phase gradient ($\Phi_B$). Alternatively, steps similar to steps 1002-1018 using Ant 3, Ant 4, S3, and S4 instead of Ant 1, Ant 2, S1, and S2, respectively, can be performed in parallel to steps 1002-1018 for the vertical phase gradient ($\Phi_B$) in some embodiments.

Finally, at 1022, the tag can be configured and modulated for data. For example, QPSK modulation can be used to transmit data such as a serial number, data stored in the tag, etc.

In some embodiment, other antennas in an array can also be used in process 1000 to improve accuracy. For example, each RSSI measurement made for antennas 1 and 2 of FIG. 8 can also be made for antennas 5 and 6 of FIG. 8 and the average of the two RSSI measurements used. As another example, each RSSI measurement made for antennas 3 and 4 of FIG. 8 can also be made for antennas 7 and 8 of FIG. 8 and the average of the two RSSI measurements used.

In some embodiments, assuming area constrained applications, using N times the carrier frequency with antenna aperture similar to 1×1 array improves the range $\sqrt{N^3}$ times. In some embodiments, increasing the number of antennas and antenna loads allows higher order modulations with narrower beams for more efficient data transfer or security from unwanted readers.

In some embodiments, direction of arrival estimation performance can be improved by mitigating interference using band select filters placed before each power detector.

Although specific components are described herein, it should be apparent that other components can be used to provide the same or similar functions and/or additional functions in some embodiments. For example, while an MCU is described herein as performing certain processes, it should be apparent that any suitable hardware processor (e.g., microprocessor, controller, digital signal processor, dedicated logic, and/or any other suitable circuitry) can be used to perform some or all of these processes in some embodiments. As another example, in some embodiments, memory and/or storage can be used to store programs, data, and/or any other suitable information in some embodiments. For example, memory and/or storage can include random access memory, read-only memory, flash memory, hard disk storage, optical media, and/or any other suitable memory.

In some embodiments, at least some of the above described blocks of the process of FIG. 10 can be executed or performed in any order or sequence not limited to the order and sequence shown in and described in connection with the figure. Also, some of the above blocks of FIG. 10 can be executed or performed substantially simultaneously where appropriate or in parallel to reduce latency and processing times. Additionally or alternatively, some of the above described blocks of the process of FIG. 10 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for a multi-antenna, directional backscatter tag, comprising:
    a plurality of antennas;
    a plurality of single pole, multiple throw switches each having a pole terminal connected to a corresponding one of the plurality of antennas, and each having a first throw terminal connected to a first side of an inductor for that switch, a second throw terminal connected to a first side of a capacitor for that switch, a third throw terminal connected to a fixed voltage level, a fourth throw terminal that is floating, and a fifth throw terminal, wherein a second side of the inductor and a second side of the capacitor are connected to the fixed voltage level;
    a power combiner having inputs connected to the fifth throw terminal of each of two of the plurality of single pole, multiple throw switches and having an output;
    a power detector having an input connected to the output of the power combiner and having an output;
    an analog to digital converter having an input connected to the output of the power detector and having an output;
    a hardware processor coupled to the output of the analog to digital converter and coupled to a control terminal of each of the plurality of single pole, multiple throw switches.

2. The system of claim 1, wherein the fixed voltage level is ground.

3. The system of claim 1, wherein hardware processor is configured to configure:
    a first switch of the two of the plurality of single pole, multiple throw switches so that the pole terminal of the first switch is connected to the fifth throw terminal of the first switch but not to the first pole terminal, the second pole terminal, the third pole terminal, or the fourth pole terminal of the first switch; and
    a second switch of the two of the plurality of single pole, multiple throw switches so that the pole terminal of the connected switch is connected to the fifth throw terminal and the third throw terminal of the second switch but not to the first pole terminal, the second pole terminal, or the fourth pole terminal of the second switch.

4. The system of claim 3, wherein hardware processor is further configured to configure:
    the first switch of the two of the plurality of single pole, multiple throw switches so that the pole terminal of the first switch is connected to the fifth throw terminal of the first switch but not to the first pole terminal, the second pole terminal, the third pole terminal, or the fourth pole terminal of the first switch; and
    the second switch of the two of the plurality of single pole, multiple throw switches so that the pole terminal of the connected switch is connected to the fifth throw terminal of the second switch but not to the first pole terminal, the second pole terminal, the third pole terminal, or the fourth pole terminal of the second switch.

5. The system of claim 4, wherein hardware processor is further configured to configure:
    the first switch of the two of the plurality of single pole, multiple throw switches so that the pole terminal of the first switch is connected to the fifth throw terminal and the first throw terminal of the first switch but not to the second pole terminal, the third pole terminal, or the fourth pole terminal of the first switch; and
    the second switch of the two of the plurality of single pole, multiple throw switches so that the pole terminal of the connected switch is connected to the fifth throw terminal and the second throw terminal of the second switch but not to the first pole terminal, the third pole terminal, or the fourth pole terminal of the second switch.

6. The system of claim 5, wherein hardware processor is further configured to configure:
    the first switch of the two of the plurality of single pole, multiple throw switches so that the pole terminal of the first switch is connected to the fifth throw terminal and second throw terminal of the first switch but not to the first pole terminal, the third pole terminal, or the fourth pole terminal of the first switch; and
    the second switch of the two of the plurality of single pole, multiple throw switches so that the pole terminal of the connected switch is connected to the fifth throw terminal and the first throw terminal of the second switch but not to the second pole terminal, the third pole terminal, or the fourth pole terminal of the second switch.

7. The system of claim 3, wherein hardware processor is further configured to measure the received power at two of the plurality of antennas.

8. The system of claim 1, wherein the hardware processor is further configured to determine a direction of arrival of an RF signal received at the plurality of antennas.

9. The system of claim 8, wherein the hardware processor is further configured to configure the plurality of single pole, multiple throw switches to cause the plurality of antennas to backscatter an RF signal received at the plurality of antennas in the direction of arrival.

10. The system of claim 1, wherein the hardware processor is further configured to QPSK modulate the plurality of antennas by controlling the plurality of single pole, multiple throw switches.

* * * * *